US011099635B2

(12) United States Patent
Wang

(10) Patent No.: US 11,099,635 B2
(45) Date of Patent: Aug. 24, 2021

(54) BLOW EVENT DETECTION AND MODE SWITCHING WITH AN ELECTRONIC DEVICE

(71) Applicant: Apple Inc., Cupertino, CA (US)

(72) Inventor: Jiang Wang, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/834,783

(22) Filed: Mar. 30, 2020

(65) Prior Publication Data

US 2021/0096637 A1 Apr. 1, 2021

Related U.S. Application Data

(60) Provisional application No. 62/907,545, filed on Sep. 27, 2019.

(51) Int. Cl.
*G06F 3/01* (2006.01)
(52) U.S. Cl.
CPC .................................. *G06F 3/011* (2013.01)
(58) Field of Classification Search
CPC ............. G06F 3/011; G06F 3/01; G06F 3/017
See application file for complete search history.

(56) References Cited

U.S. PATENT DOCUMENTS

| 9,513,703 | B2 | 12/2016 | Whitney et al. |
| 10,082,877 | B2 | 9/2018 | Tokish et al. |
| 10,185,416 | B2 | 1/2019 | Mistry et al. |
| 2005/0195155 | A1* | 9/2005 | Bonnat ............... H01H 3/14 345/156 |
| 2009/0249202 | A1* | 10/2009 | Bonnat ............... G06F 3/011 715/700 |
| 2011/0059733 | A1* | 3/2011 | Kim .................. G06F 1/1626 455/418 |
| 2011/0153323 | A1* | 6/2011 | Kim .................. G06F 3/165 704/235 |
| 2012/0075462 | A1* | 3/2012 | Chen .................. G06F 3/011 348/135 |
| 2013/0090931 | A1* | 4/2013 | Ghovanloo ........... A61F 4/00 704/275 |
| 2014/0004908 | A1* | 1/2014 | Park ................. H04M 1/72522 455/566 |
| 2014/0016668 | A1* | 1/2014 | Boni .................. G06F 3/017 374/143 |
| 2014/0055346 | A1* | 2/2014 | Boni .................. H03K 17/94 345/156 |
| 2014/0244272 | A1* | 8/2014 | Shao .................. G06F 3/01 704/275 |
| 2014/0351700 | A1* | 11/2014 | Feng .................. G06F 3/011 715/702 |

(Continued)

FOREIGN PATENT DOCUMENTS

CN 104932679 A 9/2015

OTHER PUBLICATIONS

Raj et al. "Air Blow Localization Algorithm and Applications." IEEE Recent Advances in Intelligent Computational Systems (RAICS), Dec. 10-12, 2015, pp. 274-279.

*Primary Examiner* — Albert K Wong
(74) *Attorney, Agent, or Firm* — Kubota & Basol LLP

(57) ABSTRACT

Systems, methods, and computer-readable media for detecting blow events with an electronic device and for switching between different modes of an electronic device based on detected blow events are provided.

13 Claims, 14 Drawing Sheets

(56) References Cited

U.S. PATENT DOCUMENTS

| | | | |
|---|---|---|---|
| 2015/0007092 A1* | 1/2015 | Park | G06F 1/1694 |
| | | | 715/776 |
| 2016/0187968 A1* | 6/2016 | Chiu | G06F 1/1626 |
| | | | 345/156 |
| 2016/0273986 A1 | 9/2016 | Neubarth et al. | |
| 2017/0000382 A1* | 1/2017 | Leydon | A61B 5/0022 |
| 2017/0300109 A1* | 10/2017 | Chen | G06F 1/1694 |
| 2018/0064402 A1* | 3/2018 | Leydon | A61B 5/6898 |
| 2018/0073889 A1* | 3/2018 | Vigilante | G01C 21/20 |
| 2018/0095586 A1* | 4/2018 | Cho | G06F 3/011 |
| 2018/0120293 A1* | 5/2018 | Neumann | A61B 5/744 |
| 2018/0329612 A1* | 11/2018 | Tao | G06F 3/017 |
| 2019/0072384 A1 | 3/2019 | MacNeil et al. | |
| 2019/0086284 A1 | 3/2019 | MacNeil et al. | |
| 2019/0102029 A1* | 4/2019 | Wong | G06F 1/1643 |
| 2019/0240652 A1* | 8/2019 | Bornmann | B01L 3/0237 |
| 2019/0383688 A1 | 12/2019 | Balasubramanian et al. | |

\* cited by examiner

BLOW EVENT DETECTION AND MODE SWITCHING WITH AN ELECTRONIC DEVICE

CROSS-REFERENCE TO RELATED APPLICATION(S)

This application claims the benefit of prior filed U.S. Provisional Patent Application No. 62/907,545, filed Sep. 27, 2019, which is hereby incorporated by reference herein in its entirety.

FIELD

This generally relates to detecting blow events with an electronic device and to switching between different modes of an electronic device based on detected blow events.

BACKGROUND

Portable electronic devices often require a first hand of a user to hold or wear the device and a second hand to physically interact with the device for providing user input commands for controlling the functionality of the electronic device. When a user is unable to directly physically interact with an electronic device for providing input commands, the user experience provided by the device is significantly reduced.

SUMMARY

Systems, methods, and computer-readable media for detecting blow events with an electronic device and for switching between different modes of an electronic device based on detected blow events are provided.

For example, an electronic device is provided that may include a device housing defining an interior space, a blow detection assembly positioned at least partially within the interior space, and a controller communicatively coupled to the blow detection assembly and operative to use the blow detection assembly to detect a blow event that includes a current of air blown on the device housing and, in response to detection of the blow event, automatically initiate a new control mode of the electronic device.

As another example, an electronic device is provided that may include a device housing defining an interior space, a pressure sensor positioned at least partially within the interior space, a motion sensor positioned at least partially within the interior space, and a controller communicatively coupled to the pressure sensor and the motion sensor and operative to use pressure sensor data from the pressure sensor and motion sensor data from the motion sensor to detect a current of air blown on the device housing.

As yet another example, a method for operating an electronic device including a housing, a blow detection assembly positioned at least partially within the housing, and a processor is provided that may include detecting a blow event on the housing with the blow detection assembly and automatically triggering a new control mode of the processor based on the detecting.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which.

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

The present disclosure relates to triggering a particular control mode of an electronic device in response to the device detecting a blow event (e.g., a current of air operative to increase the pressure detected by a blow detection assembly of the device). Such a blow event may be generated by a user without the user having to directly physically interact with or touch the electronic device (e.g., without having to press or swipe or otherwise impart a physical gesture onto a physical structure or mechanical input component of the device (e.g., a touch screen or button or the like), which may be helpful when the user's hand(s) are otherwise preoccupied. The control mode that may be initiated in response to such detection of a blow event may be a control mode in which the electronic device may use various types of detected motion events as user input commands for controlling the device (e.g., for navigating a user interface of the device). For example, different subtle or gentle movements of the device in three-dimensional space (e.g., in any of six degrees of freedom) may be operative to be detected and used by the device as different user input commands similarly to different user input commands that may otherwise have been detected via physical touch user input components of the device.

Systems, methods, and computer-readable media for detecting blow events with an electronic device and for switching between different modes of the electronic device based on detected blow events are provided and described with reference to FIGS. 1-11.

Figure 1:
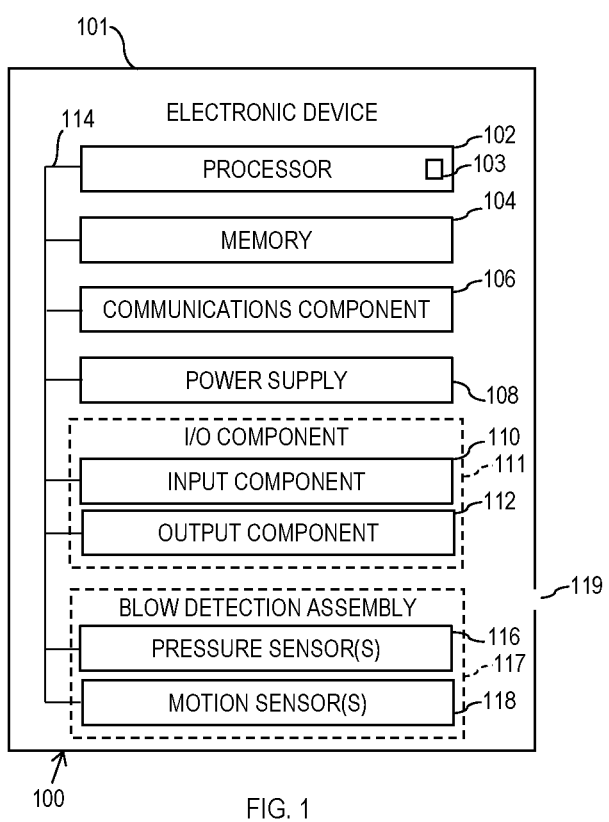
FIG. 1 is a schematic diagram of an electronic device having a blow detection assembly.

FIG. 1 is a schematic view of an illustrative electronic device 100 that may be configured to detect blow events and/or be configured to switch between different modes based on detected blow events. Electronic device 100 may be any portable, mobile, or hand-held electronic device configured to detect and/or be controlled by blow events. Alternatively, electronic device 100 may not be portable at all, but may instead be generally stationary. Electronic device 100 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc. to be worn on a wrist, a head-wearable device, etc.), boom box, modem, router, printer, and combinations thereof. Electronic device 100 may include any suitable controller or control circuitry or processor 102, memory 104, communications component 106, power supply 108, input component 110, output component 112, and blow detection assembly 117. Electronic device 100 may also include a bus 114 that may provide one or more wired or wireless communication links or paths for transferring data and/or power to, from, or between various other components of device 100. Device 100 may also be provided with a device housing 101 that may at least partially enclose one or more of the components of device 100 for protection from debris and other degrading forces external to device 100. Device housing 101 may provide at least a portion of the cosmetic exterior of device 100 and may be made of any suitable material(s), including, but not limited to, glass, ceramic, metal, plastic, wood, rubber, and/or the like. In some embodiments, one or more of the components may be provided within its own device housing (e.g., input component 110 may be an independent keyboard or mouse within its own device housing that may wirelessly or through a wire communicate with processor 102, which may be provided within its own device housing). In some embodiments, one or more components of electronic device 100 may be combined or omitted. Moreover, electronic device 100 may include other components not combined or included in FIG. 1. For example, device 100 may include any other suitable components or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software and/or firmware (e.g., applications or algorithms or the like for implementing any suitable functions on device 100 (e.g., blow event detection functions, wrist gesture control functions, raise-to-wake detection functions, etc.)), preference information (e.g., media playback preferences), lifestyle information (e.g., food preferences), exercise information (e.g., information obtained by exercise monitoring equipment), transaction information (e.g., credit card information), wireless connection information (e.g., information that may enable device 100 to establish a wireless connection with any other suitable device or server or other remote entity), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., a host device (not shown)) using any suitable communications protocol(s). For example, communications component 106 may support Wi-Fi (e.g., an 802.11 protocol), Ethernet, Bluetooth™, near field communication ("NFC"), radio-frequency identification ("RFID"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), broadband cellular network technology (e.g., 3G, 4G, 5G, etc.), any other communications protocol, or any combination thereof. Communications component 106 may also include circuitry that can enable device 100 to be electrically coupled to another device or server or subsystem and communicate with that other device, either wirelessly or via a wired connection.

Power supply 108 may provide power to one or more of the components of device 100. In some embodiments, power supply 108 can include one or more batteries for providing power (e.g., when device 100 is used as a portable device, such as a cellular telephone). In some embodiments, power supply 108 can be coupled to a power grid (e.g., for charging a portable battery and/or when device 100 is not being used as a portable device, such as a desktop computer). As another example, power supply 108 can be configured to generate power from a natural source (e.g., solar power using solar cells).

One or more input components 110 may be provided to permit a user to interact or interface with device 100 and/or to sense certain information about the ambient environment. For example, input component 110 can take a variety of forms, including, but not limited to, a touch pad, trackpad, dial, click wheel, scroll wheel, touch screen, one or more buttons, a keyboard, push-button switch, rotary dial, mouse, joy stick, track ball, switch, photocell, force-sensing resistor ("FSR"), encoder (e.g., rotary encoder and/or shaft encoder that may convert an angular position or motion of a shaft or axle to an analog or digital code), microphone, camera, scanner (e.g., a barcode scanner or any other suitable scanner that may obtain product identifying information from a code, such as a linear barcode, a matrix barcode (e.g., a quick response ("QR") code), or the like), proximity sensor (e.g., capacitive proximity sensor), biometric sensor (e.g., a fingerprint reader or other feature recognition sensor, which may operate in conjunction with a feature-processing application that may be accessible to electronic device 100 for authenticating or otherwise identifying or detecting a user), line-in connector for data and/or power, force sensor (e.g., any suitable capacitive sensors, pressure sensors, strain gauges, sensing plates (e.g., capacitive and/or strain sensing plates), etc.), temperature sensor (e.g., thermistor, thermocouple, thermometer, silicon bandgap temperature sensor, bimetal sensor, etc.) for detecting the temperature of a portion of electronic device 100 or an ambient environment thereof, a performance analyzer for detecting an application characteristic related to the current operation of one or more components of electronic device 100 (e.g., processor 102), motion sensor (e.g., single-axis or multi-axis accelerometers, angular rate or inertial sensors (e.g., optical gyroscopes, vibrating gyroscopes, gas rate gyroscopes, or ring gyroscopes), linear velocity sensors, and/or the like), magnetometer (e.g., scalar or vector magnetometer), pressure sensor, humidity sensor, barometric sensor, light sensor (e.g., ambient light sensor ("ALS"), infrared ("IR") sensor, etc.), thermal sensor, acoustic sensor, sonic or sonar sensor, radar sensor, image sensor, video sensor, global positioning system ("GPS") detector, radio frequency ("RF") detector, RF or acoustic Doppler detector, RF triangulation detector, electrical charge sensor, peripheral device detector, event counter, and any combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. An output component of electronic device 100 may take various forms, including, but not limited to, audio speakers, headphones, data and/or power line-outs, visual displays (e.g., for transmitting data via visible light and/or via invisible light), antennas, infrared ports, flashes (e.g., light sources for providing artificial light for illuminating an environment of the device), tactile/haptic/taptic outputs (e.g., rumblers, vibrators, haptic actuators, any suitable components that may be operative to provide tactile sensations in the form of vibrations and/or the like, etc.), and any combinations thereof.

It should be noted that one or more input components 110 and one or more output components 112 may sometimes be referred to collectively herein as an input/output ("I/O") component or I/O interface 111. For example, a touch sensor type of input component 110 and display type of output component 112 may sometimes be a single I/O component 111, such as a touch screen, that may receive input information through a user's touch of a display screen and that may also provide visual information to a user via that same display screen.

Electronic device 100 may include one or more blow detection assemblies 117 that may be operative to detect any suitable blow events in the environment of device 100 as may be generated or otherwise caused by any suitable source (e.g., a user's mouth expelling air or any other suitable fluid through pursed lips that may create an air current). Blow detection assembly 117 may include one or more particular input components, such as any suitable type(s) of input component 110. As just one example, as shown, blow detection assembly 117 may include one or more pressure sensors 116 and one or more motion sensors 118. Pressure sensor 116 may include any suitable pressure sensing element(s) (e.g., a micro-electro-mechanical system ("MEMS") element, a piezo element, a membrane coupled to a capacitive or resistive transducer circuit, and/or the like) and may include any suitable processing circuitry for the pressure sensor. At least one pressure sensor 116 of blow detection assembly 117 may be disposed within a housing 101 of device 100 at or near an opening 119 through the housing that may allow ambient air and pressure to pass through the housing to the blow detection assembly. A pressure sensor 116 (e.g., sometimes referred to as pressure sensor circuitry, a pressure sensor array, or a pressure sensor structure) may include one or more pressure sensors that measure the air pressure of the surrounding environment. A pressure sensor 116 may, for example, include one or more absolute barometric diaphragm-based pressure sensors formed from piezo-resistors embedded in a micro-machined silicon diaphragm (e.g., sometimes referred to as a piezo-resistive pressure sensor). This is, however, merely illustrative. If desired, other suitable pressure sensor technology may be used (e.g., strain gauge based pressure sensors having a metal strain gauge on a metal diaphragm, capacitive based pressure sensors having a parallel plate capacitor structure on a diaphragm, other suitable microelectromechanical systems based pressure sensors, etc.). Pressure sensor 116 may include one or more low-noise pressure sensors (e.g., with root-mean-squared ("RMS") noise of about 0.3 Pascal (Pa) or less at 1 Atmosphere (atm)). Additionally or alternatively, blow detection assembly 117 may include an array of humidity and temperature sensors. For example, blow detection assembly 117 may include an array of multiple humidity/temperature sensors and the output from each of these sensors may be combined to generate a single user input event (e.g., the intensity of a user's blow event can be calculated by analyzing the temperature and humidity profiles, where a differential in the intensity measured among these sensors can be used to detect the location of the blow event, which may be used to determine the intention of the user intuitively depending on the application).

Processor 102 of device 100 may include any processing circuitry operative to control the operations and performance of one or more components of electronic device 100. For example, processor 102 may be used to run one or more applications, such as an application 103. Application 103 may include, but is not limited to, one or more operating system applications, firmware applications, and/or software applications, such as software implementing functions associated with gathering and processing sensor data (e.g., applications or algorithms or the like that may be configured to identify the existence of a blow event (e.g., based on any suitable detection(s) that may be made by blow detection assembly 117) and/or to switch between modes of the electronic device (e.g., based on any suitable identified blow event(s)) and/or to identify the existence of a raise-to-wake event (e.g., based on any suitable motion detections made by any suitable device sensors) and/or to identify the existence of a wrist gesture control event (e.g., based on any suitable motion detections made by any suitable device sensors) and/or the like), media playback applications, media editing applications, sensor calibration applications, pass applications, calendar applications, state determination applications (e.g., device state determination applications), biometric feature-processing applications, compass applications, health applications, thermometer applications, weather applications, thermal management applications, force sensing applications, device diagnostic applications, video game applications, or any other suitable applications. For example, processor 102 may load application 103 as a user interface program or any other suitable program to determine how instructions or data received or detected via any suitable one or more input components 110/blow detection assemblies 117 (e.g., due to user interaction with a mechanical button and/or motion sensor and/or blow detector, etc.) and/or any other component of device 100 (e.g., application data indicative of any suitable event (e.g., a calendar event) and/or remote data that may be received via communications component 106, etc.) may manipulate the one or more ways in which information may be stored on device 100 (e.g., in memory 104) and/or provided to a user via an output component 112 (e.g., via a haptic actuator output component) and/or communicated to a remote subsystem (e.g., to any other electronic device or remote server or the like via communications component 106). Application 103 may be accessed by processor 102 from any suitable source, such as from memory 104 (e.g., via bus 114) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors (e.g., one or more sensors or other types of input components may include its own processing circuitry). Processor 102 also may include on board memory for caching purposes. Processor 102 may be implemented as any electronic device capable of processing, receiving, or transmitting data or instructions. For example, processor 102 can be a microprocessor, a central processing unit, an application-specific integrated circuit ("ASIC"), a field-programmable gate array ("FPGA"), a digital signal processor, an analog circuit, a digital circuit, or combination of such devices. Processor 102 may be a single-thread or multi-thread processor. Processor 102 may be a single-core or multi-core processor. Accordingly, as described herein, the term "processor" may refer to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements. Processor or processing unit or controller 102 may be configured to access memory 104, which may have various instructions, computer programs or other data stored thereon. The instructions or computer programs may be configured to perform one or more of the operations or functions described with respect to electronic device 100. For example, the instructions may be configured to control or coordinate the operation of one or more input components 110, one or more output components 112, one or more communications components 106, one or more power supplies 108, one or more blow detection assemblies 117, and/or any other suitable component(s) of device 100.

Figure 2:
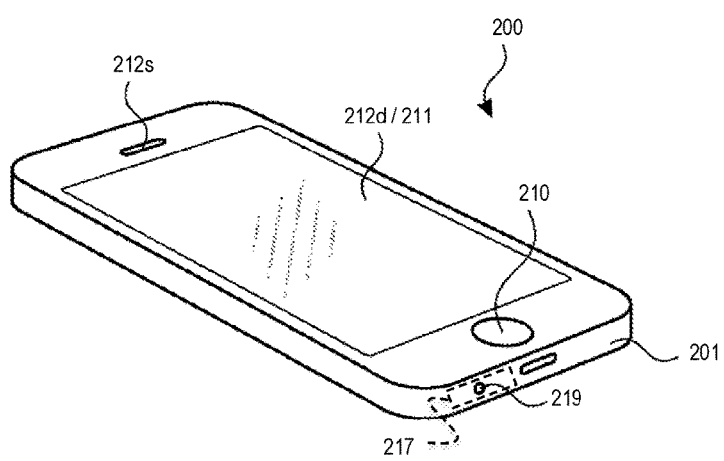
FIG. 2 is a perspective view of an illustrative electronic device having a blow detection assembly and implemented in the form of a handheld device.
Figure 3:
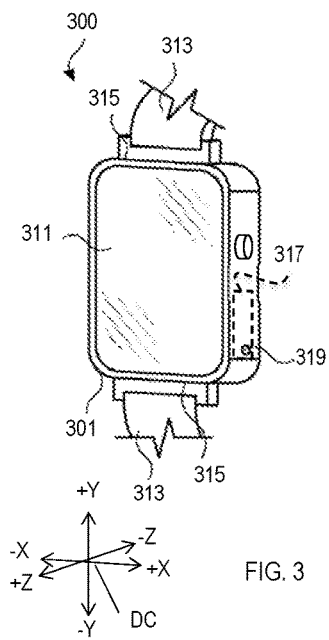
FIG. 3 is a perspective view of another illustrative electronic device having a blow detection assembly and implemented in the form of a wearable device.

As shown in FIG. 2, an electronic device 200, which may be similar to electronic device 100, may be implemented using a housing 201 that may be sufficiently small to fit within a user's hand (e.g., device 200 of FIG. 2 may be a handheld electronic device, such as a cellular telephone). Housing 201, which may sometimes be referred to as a case, may be formed of plastic, glass, ceramics, fiber composites, metal (e.g., stainless steel, aluminum, etc.), other suitable materials, or a combination of any two or more of these materials. Housing 201 may include one or more openings, such as an opening 219. In the example of FIG. 2, opening 219 may be formed in a sidewall of housing 201 and may provide a fluid coupling for airflow between an environment external to housing 201 and a space that may be at least partially defined by and/or protected by housing 201 and/or that may at least partially contain a pressure sensor or any other suitable component(s) of a blow detection assembly 217 of device 200. For example, a pressure sensor of device 200 may be mounted internal to housing 201 adjacent to opening 219 to receive airflow from the external environment through opening 219. As shown in FIG. 2, device 200 may include a display output component 212*d* mounted on the front of housing 201, such as for providing a display of a touch screen I/O component 211. Display output component 212*d* may provide one or more openings (e.g., openings in the inactive or active portions of display output component 212*d*) and/or housing 201 may provide one or more openings, where such an opening may accommodate a button input component 210 and/or accommodate a port of a speaker output component 212*s* and/or accommodate any other suitable exposure of any other suitable device component (e.g., microphone, etc.) to an external environment and where such an opening may be used in addition to or as an alternative to a dedicated pressure sensor opening (e.g., opening 219) for enabling airflow to be received by a blow detection assembly of the device (e.g., one or more openings may be used to enable airflow to be received by a blow detection assembly of the device and to enable any other suitable user interaction (e.g., to enable sound waves to be received by a microphone and/or to be emitted by a speaker, etc.)). The configuration of electronic device 200 of FIG. 2 is merely illustrative. In other implementations, electronic device 200 may be a laptop computer, a tablet computer, a somewhat smaller portable device such as a wrist-watch device, pendant device, or other wearable or miniature device, a media player, a gaming device, a navigation device, a fitness device, or other electronic equipment. For example, FIG. 3 is a perspective view of an electronic device 300, which may be similar to electronic device 100, and which may be implemented in the form of a wearable device, such as a smart watch, that may include an opening 319 in a housing 301 that may provide a fluid coupling for airflow between an environment external to housing 301 and a space that may be at least partially defined by and/or protected by housing 201 and/or that may at least partially contain a pressure sensor or any other suitable component(s) of a blow detection assembly 317 of device 300. As shown, in a smart watch implementation, a strap 313 may be coupled to housing 301 at interfaces 315 and may be arranged to secure device 300 to a part of a user's body, such as around the user's wrist (see, e.g., FIGS. 8A-8D), for presenting a touch screen I/O component 311 to the user. Although opening 319 may be shown by FIG. 3 to be provided through a right side surface of housing 301, it is to be understood that any such opening may be provided through any suitable portion of any suitable housing of the electronic device and the electronic device may include any suitable number (e.g., 1, 2, 3, etc.) of such openings at various different locations (e.g., different openings may be used for different purposes and/or one opening may be used for multiple purposes (e.g., one or more openings may be used to enable airflow to be received by a blow detection assembly of the device and to enable any other suitable user interaction (e.g., to enable sound waves to be received by a microphone and/or to be emitted by a speaker, etc.)).

Figure 4:
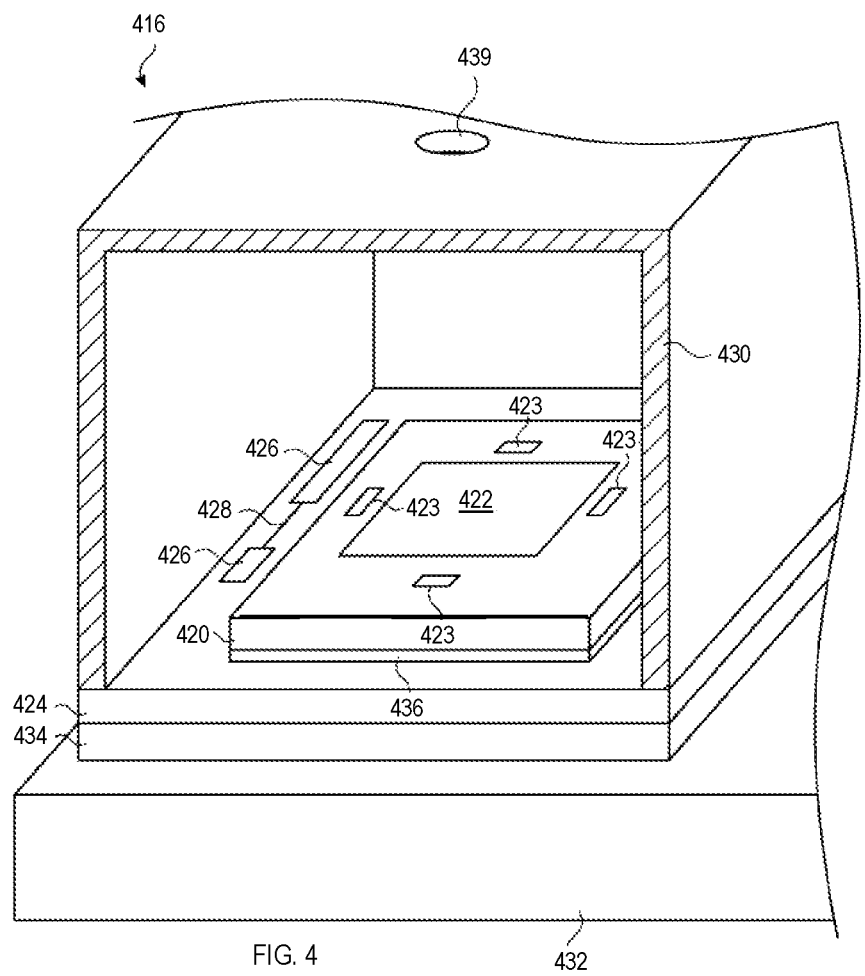
FIG. 4 is a perspective view of an illustrative pressure sensor of a blow detection assembly.

FIG. 4 is a perspective view of an exemplary implementation of a pressure sensor 416, which may be provided as just one possible type of pressure sensor 116 of blow detection assembly 117 of device 100. As shown in FIG. 4, pressure sensor 416 may include a pressure sensing element 420, which may include a pressure sensing membrane 422. Pressure sensing element 420 may, for example, be a semiconductor die, such as a silicon die, that may include any suitable number of sensing elements 423 that may sense deformations of pressure sensing membrane 422 due to changes in pressure at membrane 422. In one example, sensing elements 423 may be resistive elements in a silicon die for which the resistance changes in a detectable manner due to deformations of the silicon (e.g., due to deformation of membrane 422).

Pressure sensor 416 may include sensor processing circuitry that processes pressure sensor data based on changes in sensing elements 423. The processing circuitry may be formed on or within a sensor circuitry substrate 424. Substrate 424 may be a pressure sensor application specific integrated circuit ("ASIC") that may include one or more integrated circuit elements 426. Integrated circuit elements 426 can include processing and/or storage elements and may be coupled by traces 428 on or within the sensor circuitry substrate to each other and/or to sensing elements 423. Circuit elements 426 may perform some or all of the processing for pressure sensor 416 and may be communicatively coupled to another processor of an electronic device that may include pressure sensor 416 (e.g., processor 102 of device 100) via a printed circuit 432 (e.g., a rigid or flexible printed circuit that may communicatively couple sensor 416 to such a processor and/or memory (e.g., processor 102 and/or memory 104)). Circuit elements 426 may perform testing, calibration, and/or pressure sensing operating for pressure sensing element 420 during manufacturing and/or during normal operation (e.g., by a user) of the electronic device that may be incorporating pressure sensor 416.

As shown in FIG. 4, pressure sensor 416 may include a housing 430 (e.g., a housing formed from metal, plastic, ceramic, and/or substrate materials, such as a ceramic lid or a silicone cap die) that may have a port 439 through which ambient air can pass to pressure sensing membrane 422. Housing 430 may be a separate housing for pressure sensor 416 or may be partially or completely formed from a portion of an overall housing of the electronic device that may be incorporating pressure sensor 416 (e.g., housing 101, housing 201, or housing 301). Housing 430 may provide for a relatively small volume of air over sensing membrane 422 for faster pressure equalization and measurement accuracy. Port 439 may be an implementation of opening 119 in housing 101 or of opening 219 in housing 201 or of opening 319 in housing 301, or port 439 may be aligned with opening 119 in housing 101 or with opening 219 in housing 201 or with opening 319 in housing 301 to allow airflow from the environment external to the electronic device to pressure sensor 416 through such an opening and port 439.

Sensor 416 may include an additional substrate 434 (e.g., a ceramic substrate). Substrate 434 may be a support structure for sensor 416 and may form a portion of housing 430. Sensor 416 may also include an insulating layer 436 that may thermally insulate sensor die 420 from other components of sensor 416, such as sensor substrates 424 and/or 434, and/or housing 430. Sensing elements 423 may communicatively coupled to circuit elements 426 via any suitable contacts (not shown) that may pass through insulating layer 436, if an insulating layer is provided.

It should be appreciated that the arrangement of pressure sensor 416 shown in FIG. 4 is merely illustrative and other arrangements are contemplated. For example, sensor circuitry substrate 424 may be formed next to or otherwise separate from pressure sensing element 420 and/or support substrate 434. As another example, sensing elements 423 may be capacitive, MEMS-based, piezoelectric, or other elements that may sense deformations caused by pressure changes. In some implementations, sensor housing 430 may be omitted. Integrated circuit elements 426 of pressure sensor 416 may operate any suitable heating elements (e.g., resistive elements that may generate heat to be transferred to pressure sensing element 420) that may be disposed on or within pressure sensing element 420 (e.g., for sensor testing, sensor calibration, or any other pressure sensor operations). Additionally or alternatively, integrated circuit elements 426 of pressure sensor 416 may operate any suitable temperature sensor(s) (e.g., thermistor or the like) that may sense the temperature of pressure sensing element 420.

Figure 5:
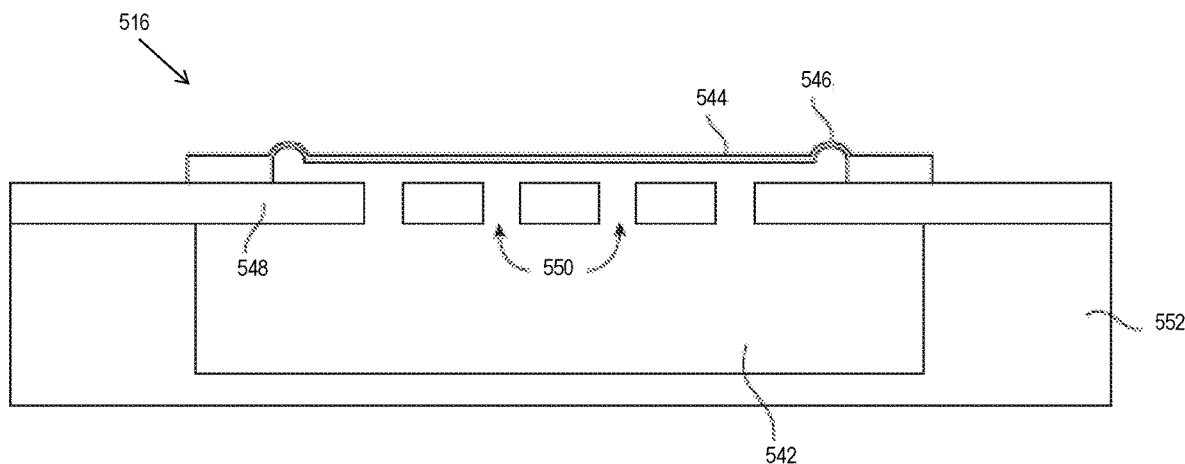
FIG. 5 is a cross-sectional side view of another illustrative pressure sensor of a blow detection assembly.

FIG. 5 is a cross-sectional side view of an illustrative implementation of a pressure sensor 516, which may be provided as just one other possible type of pressure sensor 116 of blow detection assembly 117 of device 100. As shown in FIG. 5, pressure sensor 516 may be formed from a modified condenser microphone, such as a MEMS condenser microphone. Pressure sensor 516 may include a movable member, such as a flexible diaphragm 544, that may be suspended over a cavity, such as cavity 542 (e.g., a chamber), using a suspension member 546. Diaphragm 544 may be free to move relative to a fixed structure, such as a backplate 548 and a semiconductor substrate 552. Semiconductor substrate 552 may be formed using complementary metal-oxide-semiconductor ("CMOS") technology, n-type metal-oxide-semiconductor ("NMOS") technology, p-type metal-oxide-semiconductor ("PMOS") technology, or other suitable semiconductor technology. Semiconductor substrate 552 may include circuitry, such as capacitive sensing electrodes that gather signals produced by movement of suspended diaphragm 544. Pressure waves that pass through holes 550 in backplate 548 may cause diaphragm 544 to move back and forth, causing the distance between diaphragm 544 and backplate 548 to vary, which in turn may change the capacitance detected by circuitry in substrate 552. This capacitance change can be converted into an electrical signal indicating the amplitude of the incoming pressure wave. To use a condenser microphone as a pressure sensor, different characteristics of the microphone can be modified. The size of cavity 542, the area and stiffness of diaphragm 544, and the compressibility of air in cavity 542 can play a factor in the low frequency response of sensor 516 and can be adjusted to achieve the desired response. For example, in a typical condenser microphone, vents may be used for pressure equalization and low frequency roll-off. A vent may allow air pressure to equalize between the front and back surfaces of the diaphragm to eliminate any low frequency response. To achieve a better low frequency response, sensor 516 may be formed from an unvented microphone. In the example of FIG. 5 in which sensor 516 is formed from a modified MEMS condenser microphone is merely illustrative. If desired, sensor 516 may be formed from a modified electret microphone or other suitable microphone.

Figure 6:
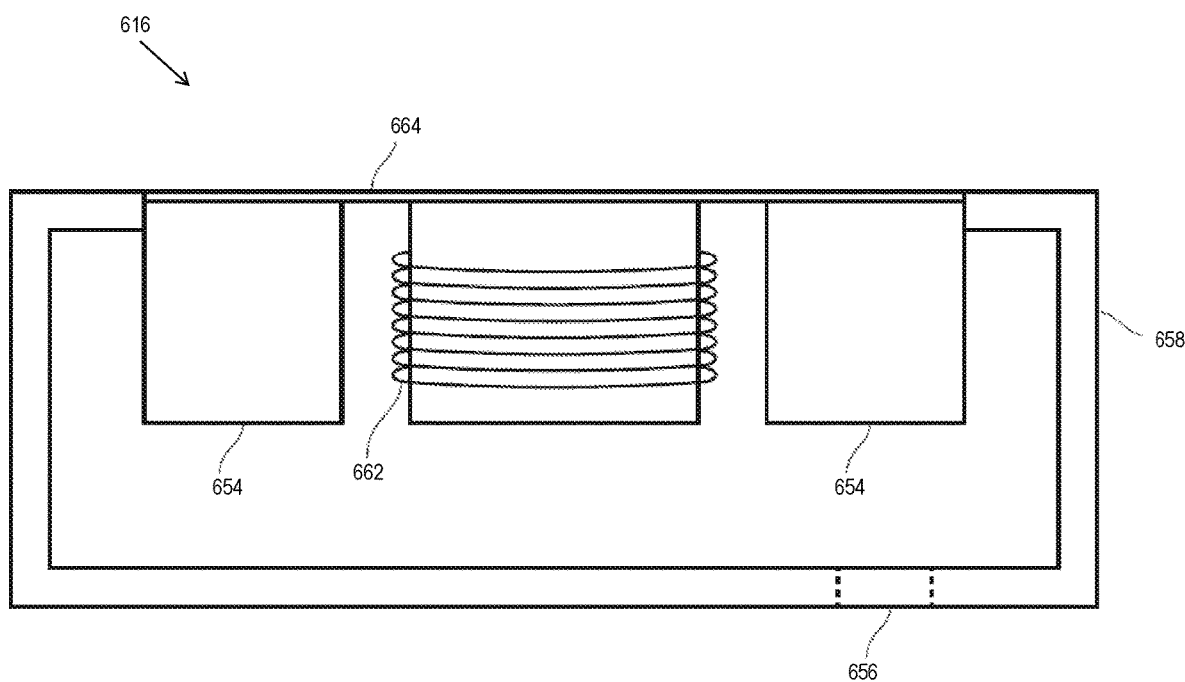
FIG. 6 is a cross-sectional side view of yet another illustrative pressure sensor of a blow detection assembly.

FIG. 6 is a cross-sectional side view of an illustrative implementation of a pressure sensor 616, which may be provided as just one other possible type of pressure sensor 116 of blow detection assembly 117 of device 100. As shown in FIG. 6, pressure sensor 616 may be formed from a modified dynamic microphone. Pressure sensor 616 may include a coil 662 attached to diaphragm 664. Coil 662 may be placed in the magnetic field of a permanent magnet 654. When pressure waves cause diaphragm 664 to vibrate, coil 662 may move in the magnetic field of magnet 654, thereby producing a current in coil 662 via electromagnetic induction. Pressure sensor 616 may be tuned to have a low frequency response (e.g., less than 1 Hz, less than 2 Hz, less than 5 Hz, etc.) by eliminating or blocking any vents, such as vent 656. By closing vent 656 or eliminating vent 656 entirely, the microphone structure may be used as a low-noise pressure sensor. The example of FIG. 6 in which coils 662 may be surrounded by magnet 654 is merely illustrative. If desired, permanent magnet 654 may be located in the center of sensor 616 and coils 662 may be wrapped around permanent magnet 654.

Figure 7:
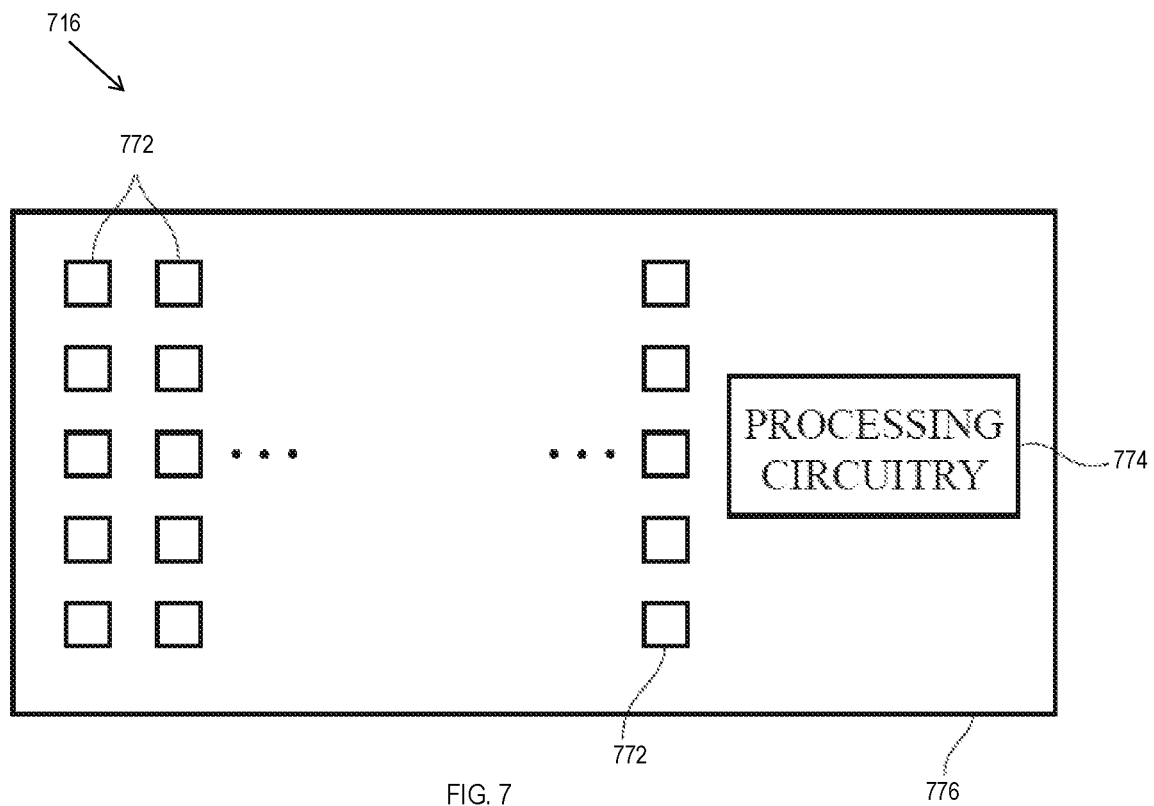
FIG. 7 is a top view of an illustrative array of pressure sensors of a blow detection assembly.
Figure 8A:
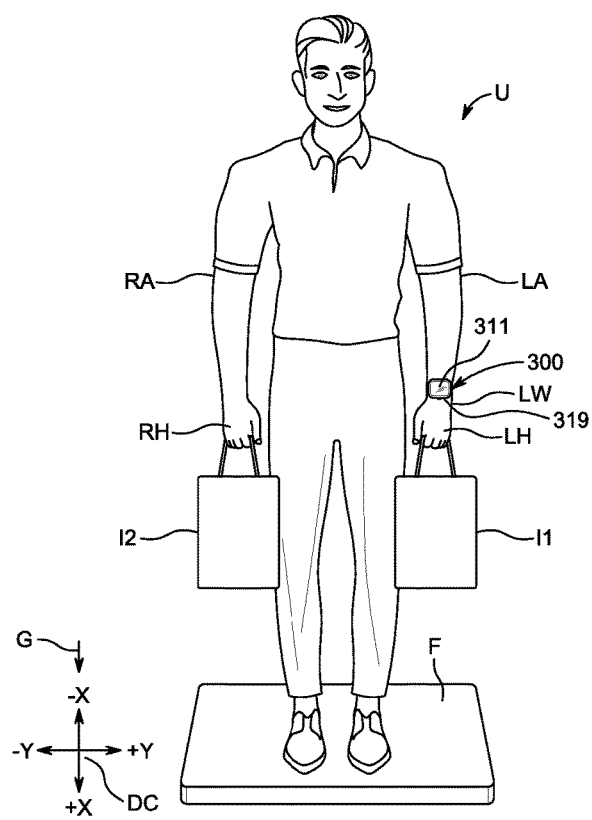
FIG. 8A is a front view of a user wearing the electronic device of FIG. 3 in a first stage of use.
Figure 8B:
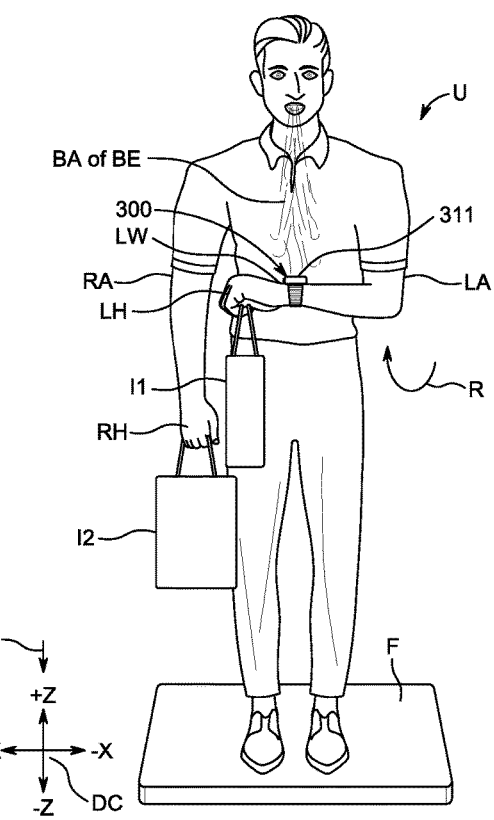
FIG. 8B is a front view of the user of FIG. 8A wearing the electronic device of FIGS. 3 and 8A in a second stage of use.
Figure 8C:
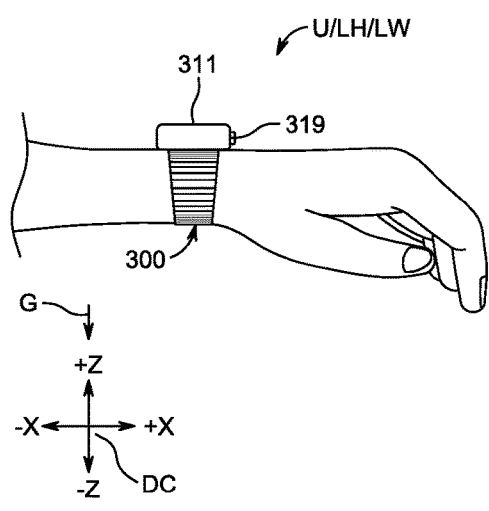
FIG. 8C is a side view of a portion of the user of FIGS. 8A and 8B wearing the electronic device of FIGS. 3, 8A, and 8B in a third stage of use.
Figure 8D:
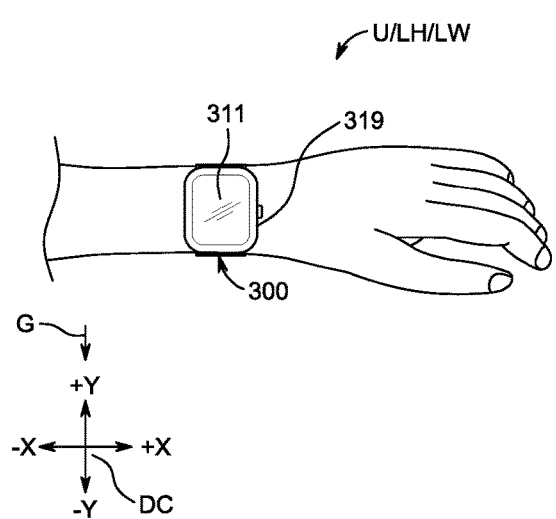
FIG. 8D is a top view of a portion of the user of FIGS. 8A-8C wearing the electronic device of FIGS. 3 and 8A-8C in a fourth stage of use.
Figure 9A:
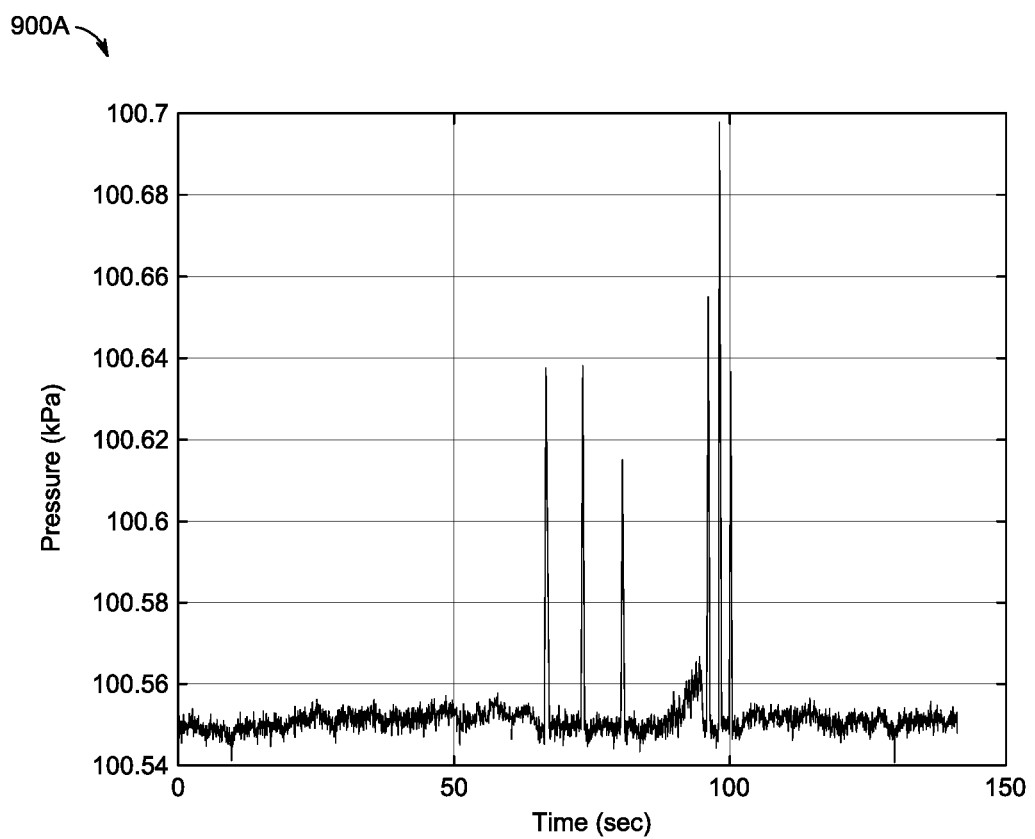
FIGS. 9A, 9B, and 9C are graphs of illustrative blow detection assembly data that may be used for detecting blow events.
Figure 9B:
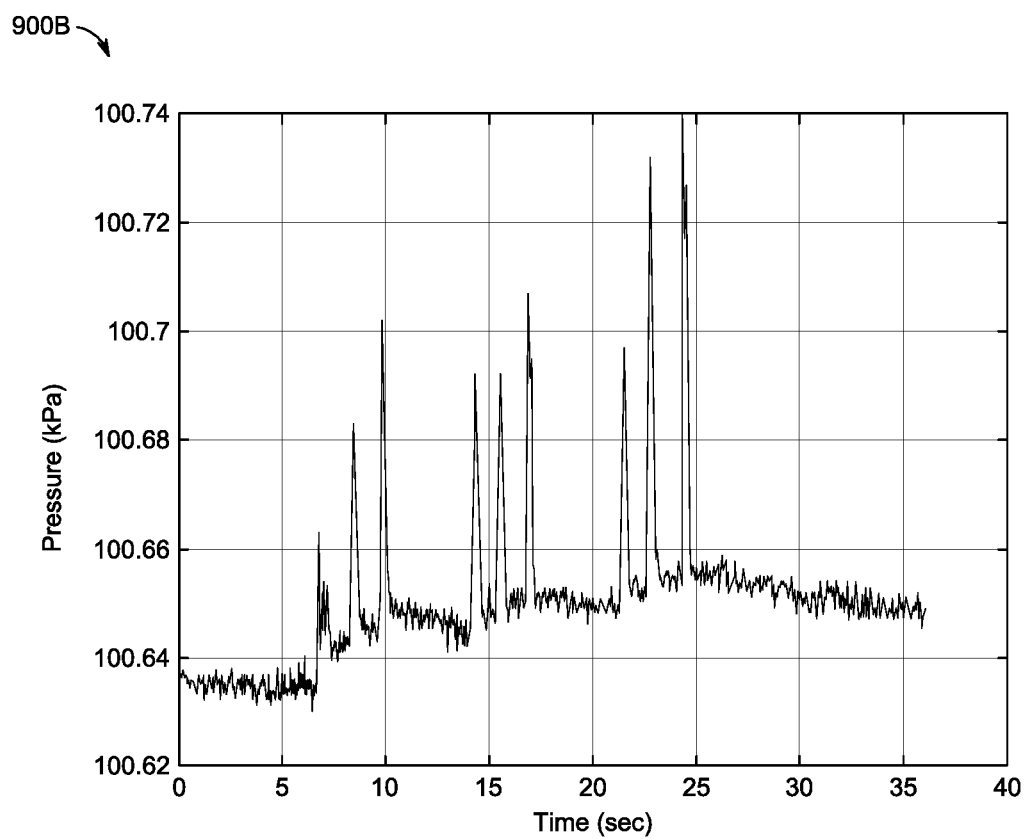
Figure 9C:
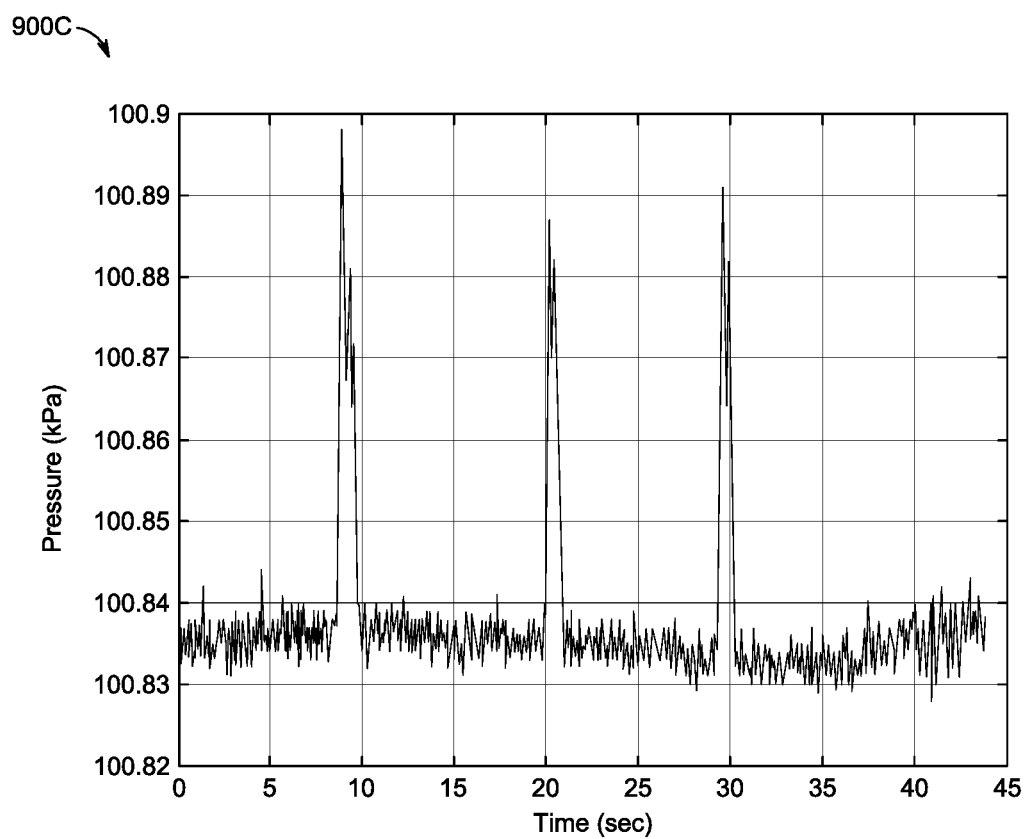

FIG. 7 is a top view of an illustrative implementation of a pressure sensor 716, which may be provided as just one other possible type of pressure sensor 116 of blow detection assembly 117 of device 100. As shown in FIG. 7, pressure sensor 716 may be formed from an array of pressure sensors 772 (e.g., an array of individual MEMS-based pressure sensors). Pressure sensors 772 may be mounted to a common substrate, such as a printed circuit substrate 776. Processing circuitry, such as processing circuitry 774 or other suitable processing circuitry may combine sensor signals from pressure sensors 772 to obtain a combined sensor signal. When combining sensor outputs, the sensor signal may increase linearly with the number of sensors while the noise level of the combined signal may increase only with the square root of the number of sensors. Accordingly, the combined sensor signal may have a significantly higher signal-to-noise ratio ("SNR") than the corresponding signal from a single sensor. For example, in arrangements where the sensor array includes 64 pressure sensors 772, the signal may grow by 64 times while the noise may only grow by the square root of 64 (i.e., 8 times), and the overall SNR may be improved by a factor of 8. If desired, individual sensors 772 may be monitored such that any failed sensor can be excluded from the signal combining process.

The accuracy of pressure sensors and microphones may be compromised by noise sources in the internal electronic circuitry that may amplify, filter, and/or digitize the sensed signals. These internal electronic noise sources may include principally thermal noise, shot noise, and flicker noise. An additional, often insignificant internal noise source may be produced by thermal noise from air molecules striking the sensor diaphragm. All of these internal noise sources may be uncorrelated with one another. The internal noise sources from one sensor may be also uncorrelated with the noise sources from other sensors. Consequently, when combining sensor outputs, the sensor signal may increase linearly with the number of sensors while the noise level of the combined signal may increase only with the square root of the number of sensors. Accordingly, the combined sensor signal may have a significantly higher SNR than the corresponding signal from a single sensor.

If desired, pressure sensors of a blow detection assembly may include different types of pressure sensors, such as an absolute pressure sensor and an unvented microphone pressure sensor of the type described in connection with FIG. 5. An absolute pressure sensor typically may measure the displacement of a diaphragm either through a piezo-resistive strain gauge or through a capacitive gap sensor. A microphone may typically respond to either the velocity of a diaphragm or to relatively short-term changes to the displacement of a diaphragm. As some absolute pressure sensors can produce signals with an excessive amount of noise, combining data from an absolute pressure sensor with data from an unvented microphone can provide a more accurate reading of barometric pressure changes. The microphone may provide low noise information about short-term changes in pressure while the absolute pressure sensor can provide absolute pressure information. Processing circuitry 774 or any other suitable processing circuitry of a device with one or more pressure sensors can combine pressure sensor signals by adding the signals together and/or using adaptive filter techniques. In another suitable arrangement, low-noise pressure sensor data can be gathered by combining an absolute sensor with an additional pressure sensor having a sealed chamber behind a diaphragm at 1 Atmosphere. If desired, the diaphragm of the additional pressure sensor may be more compliant than that of the absolute pressure sensor, and mechanical stops may be used to limit diaphragm displacement under large deviations from 1 Atmosphere.

FIGS. 8A-8D show an illustrative embodiment of electronic device 300 of FIG. 3 as may be carried by a user U. Particularly, FIGS. 8A-8D show user U wearing electronic device 300 implemented as a smart watch on left wrist LW of left arm LA of user U while user U may be holding a first item I1 (e.g., a shopping bag) with its left arm LA (e.g., in its left hand LH) as well as a second item I2 (e.g., a shopping bag) with its right arm RA (e.g., in its right hand RH). While FIGS. 8A-8D illustrate the electronic device to be a wearable electronic device (e.g., a smart watch (e.g., an Apple Watch™)) that may be wearable on wrist LW of left arm LA or otherwise by user U, it is to be understood that the electronic device may instead be a handheld electronic device (e.g., electronic device 200 (e.g., a cellular telephone (e.g., an iPhone™))) that may be held by left hand LH of left arm LA or otherwise by user U (e.g., while first item I1 may also be held by left hand LH or while a handle of first item I1 may be looped about left wrist LW of left hand LH or otherwise). In either scenario, it may be appreciated that it may be difficult for user U to interact physically with touch screen I/O component 311 of electronic device 300 with the fingers of right hand RH due to second item I2 being held by right hand RH. Moreover, in such a scenario, it may be appreciated that it may be difficult for user U to interact physically with touch screen I/O component 311 of electronic device 300 with the fingers of left hand LH due to first item I1 being held by left hand LH and/or due to electronic device 300 being worn by or held by or otherwise carried by left hand LH or left wrist LW of left hand LH. Therefore, blow detection assembly 317 may be utilized by device 300 to detect one or more blow events from user U, thereby providing user U with an alternative input mechanism that may be used for controlling device 300 while not requiring either of the user's hands to interact with I/O component 311.

As shown in at least FIGS. 3 and 8A-8D, any suitable input component(s) (e.g., motion sensor(s) (e.g., motion sensor(s) of blow detection assembly 317 (e.g., a 3-axis accelerometer, a 3-axis magnetometer, and a 3-axis gyroscope)) or otherwise) may be configured to define a device coordinate system DC (e.g., an X-Y-Z three-dimensional Cartesian coordinate system) of electronic device 300 in space and may be configured to determine movement and orientation of device coordinate system DC of device 300 relative to gravity or any other suitable reference (e.g., gravity vector G, as shown with respect to user U standing on floor F). As just one example, as shown, the display output component of touch screen I/O component 311 of electronic device 300 may be a planar display screen with an outer surface that may exist substantially in an X-Y plane of device coordinate system DC for emitting light away from device 300 generally in the +Z-direction, and strap 313 may be operative to extend at least partially about an X-axis of device coordinate system DC (e.g., such that strap 313 and housing 301 may form a loop about such an X-axis that may be coincident with a longitudinal axis of a user's forearm when device 300 is worn about the user's wrist). When worn, held, or otherwise carried by user U, device 300 and its device coordinate system DC may be moved in any of at least six degrees of freedom in three-dimensional space (e.g., relative to gravity) (e.g., change position through translation along a first axis Y of device coordinate system DC (e.g., surge (e.g., forwardly in the +Y-direction or rearwardly in the −Y-direction)), change position through translation along a second axis Z of device coordinate system DC (e.g., heave (e.g., upwardly in the +Z-direction or downwardly in the −Z-direction)), change position through translation along a third axis X of device coordinate system DC (e.g., sway (e.g., rightwardly in the +X-direction or leftwardly in the −X-direction)), change orientation through rotation about the first axis Y of device coordinate system DC (e.g., roll (e.g., clockwise or counterclockwise about longitudinal axis Y)), change orientation through rotation about the second axis Z of device coordinate system DC (e.g., yaw (e.g., clockwise or counterclockwise about normal axis Z)), and/or change orientation through rotation about the third axis X of device coordinate system DC (e.g., pitch (e.g., clockwise or counterclockwise about transverse axis X))), or otherwise physically move device 300 in any suitable manner, where such movement may be detected by any suitable sensors of device 300 and used (e.g., by any suitable application(s) and processor(s)) for controlling device 300 in any suitable manner, such as for controlling or otherwise interacting with a user interface provided by electronic device 300. In many embodiments, the user interface provided by electronic device 300 may at least partially be a graphical or otherwise visual user interface that may be presented by a display output component of electronic device 300 (e.g., via a display portion of touch screen I/O component 311). However, in other embodiments, the user interface provided by electronic device 300 may be an at least partially non-visual user interface that may instead provide audible and/or tactile information to the user.

A blow detection assembly of an electronic device may only be enabled (e.g., actively run for detecting a blow event) or effective for detecting blow events during certain stages of use of the electronic device, such as a stage of use in which the electronic device is determined to be in a particular position (e.g., in a particular orientation with respect to gravity) and/or determined to be moving in a particular manner (e.g., moving less than a particular amount). For example, in order for blow detection assembly 317 to be able to detect a blow event from user U, blow detection assembly 317 ought to be brought within a suitable distance of the user's mouth, for example, such that an air current created by air or any other gas expelled from the user's mouth may be able to pass through any suitable opening 319 or otherwise interact with device 300 in order to be detected by blow detection assembly 317. In some embodiments, device 300 may be configured to activate or otherwise use one or more features or components of device 300 (e.g., enable a blow detection assembly) in response to detecting a particular movement and/or position of device 300.

Figure 3A:
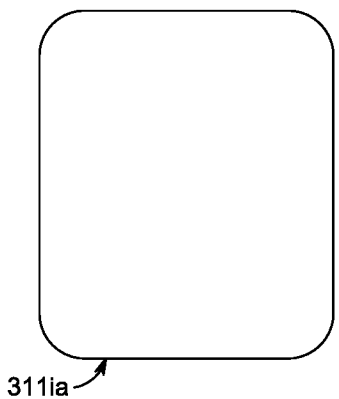
FIGS. 3A, 3B, 3C, and 3D are front views of illustrative screens of a graphical user interface of the electronic device of FIG. 3.
Figure 3B:
Figure 3C:
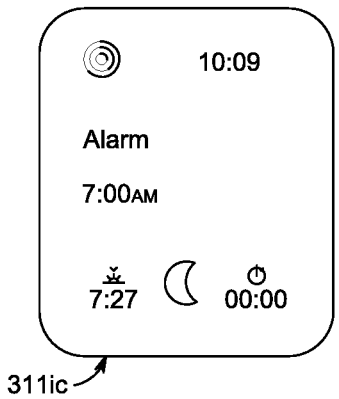
Figure 3D:
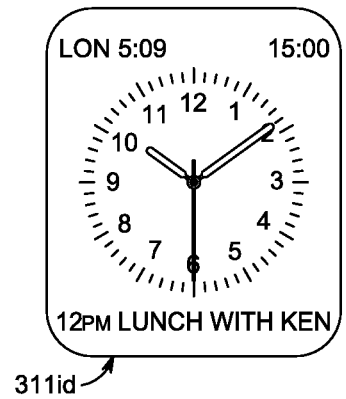

Device 300 may be configured to wake up (e.g., transition from a standby or asleep or lower power mode (e.g., a mode in which a display of I/O component 311 is turned off) to an awake or active or higher power mode (e.g., a mode in which a display of I/O component 311 is turned on for presenting a graphical user interface ("GUI"))) in response to detecting a particular movement type, such as a motion indicative of a natural flick of the wearing wrist of the user and/or a motion indicative of the user raising the wearing wrist towards the user's face. For example, device 300 may be configured to transition automatically from any suitable first mode to any suitable second mode in response to detecting any suitable raise to wake motion, such as a motion of wearing wrist LW and device coordinate system DC of device 300 along the direction of path R from the position of FIG. 8A to the position of FIG. 8B. As one particular example, in response to detecting such a raise to wake motion, device 300 may be configured to transition automatically from a sleep mode to an awake mode of I/O component 311 (e.g., from a mode in which the display of I/O component 311 may be turned off (e.g., such that a dark screen 311*ia* of FIG. 3A may be presented by I/O component 311) to a mode in which the display of I/O component 311 may be turned on (e.g., such that a first type of GUI home screen 311*ib* of FIG. 3B may be presented by I/O component 311)). Additionally, or alternatively, device 300 may be configured to transition automatically from any suitable second mode to any suitable first mode (e.g., from an awake mode to a sleep mode of I/O component 311) in response to detecting any suitable lower to rest motion, such as a motion of wearing wrist LW and device coordinate system DC of device 300 along the direction opposite of path R from the position of FIG. 8B to the position of FIG. 8A.

Once in an awake mode, an electronic device may be configured to operate in one of two or more possible control modes, such as a first control mode in which the GUI of the awake electronic device may be controlled by a first set of user input commands that may be generated through a user's interaction with a first type of input component(s) (e.g., a user touching or swiping or otherwise interacting with a touch sensitive surface (e.g., a touch screen or otherwise) and/or a user clicking or rotating or otherwise interacting with any other suitable mechanical input component (e.g., a button or digital crown or otherwise) and/or the like) and a second control mode in which the GUI of the awake electronic device may be controlled by a second set of user input commands that may be generated through a user's interaction with a second type of input component(s) (e.g., a user moving the device through space as may be detectable by any suitable motion sensor(s) of the device or a user blowing on the device as may be detectable by any suitable blow detection assembly or otherwise). For example, if user U is in the scenario of FIGS. 8A and 8B in which it may be difficult for user U to interact physically with touch screen I/O component 311 of electronic device 300 due to user U holding item I2, the user may prefer that electronic device 300 operate in a second control mode in which the GUI of the awake electronic device may be controlled by user interactions detectable by non-touch input components, such as user movement of device 300 in three-dimensional space with respect to gravity as may be detectable by motion sensor input component(s) of device 300, rather than (or in addition to) operate in a first control mode in which the GUI of the awake electronic device may be controlled by user interactions detectable by touch input components, such as user gestures on a touch-sensitive portion of I/O component 311 of device 300. Alternatively, if user U's right hand RH is not holding any items or is otherwise free to physically interact with one or more touch input components of device 300, then the user may prefer that electronic device 300 operate in such a first control mode (e.g., a mode in which motion gestures do not control the GUI (or at least a majority thereof)) rather than in such a second control mode (e.g., a mode in which motion gestures do control the GUI (or at least a majority thereof)).

A first control mode (e.g., a normal physical user interaction mode) for an awake electronic device may not utilize motion sensor data to control a user's navigation of the device's UI in the same manner as (e.g., as much as) a second control mode (e.g., an alternative motion user interaction mode (e.g., a wrist gesture control mode)) for an awake electronic device, or the first control mode may not utilize motion sensor data at all to control UI navigation. For example, input commands to navigate through different stages of a UI hierarchy may be received primarily through physical interaction between a user's finger(s) and input component(s) of the electronic device in the first control mode while motion sensor data may not be relied on for such navigation or for at least a majority of such navigation but may instead be relied on for secondary functionality (e.g., for detecting motion operative to return the device to a sleep mode from the awake mode). However, input commands to navigate through different stages of a UI hierarchy may be received primarily through movement of the electronic device within three-dimensional space detectable by any suitable motion sensor(s) of the electronic device in the second control mode, which may involve powering or operating motion sensors in a different manner in the second control mode than in the first control mode. As just one example, while electronic device 300 is in an awake mode in which the display of I/O component 311 may be turned on such that first type of GUI home screen 311ib of FIG. 3B may be presented by I/O component 311, device 300 may be configured to navigate from GUI home screen 311ib to an alarm GUI screen 311ic of FIG. 3C in response to detecting a first touch input command (e.g., detecting a swipe down gesture by a user's finger on I/O component 311) when device 300 is operating in a first control mode of the awake mode and/or device 300 may be configured to navigate from GUI home screen 311ib to alarm GUI screen 311ic of FIG. 3C in response to detecting a first motion input command (e.g., detecting a translation of device 300 in the +X direction along an axis X of device coordinate system DC) when device 300 is operating in a second control mode of the awake mode, where detecting such a first motion input command when device 300 is operating in the first control mode may not navigate the GUI in any manner. As just one other example, while electronic device 300 is in an awake mode in which the display of I/O component 311 may be turned on such that first type of GUI home screen 311ib of FIG. 3B may be presented by I/O component 311, device 300 may be configured to navigate from GUI home screen 311ib to an alternative clock GUI screen 311id of FIG. 3D in response to detecting a second touch input command (e.g., detecting a swipe left gesture by a user's finger on I/O component 311) when device 300 is operating in a first control mode of the awake mode and/or device 300 may be configured to navigate from GUI home screen 311ib to alternative clock GUI screen 311id of FIG. 3D in response to detecting a second motion input command (e.g., detecting a rotation of device 300 in a clockwise direction about a Y-axis of device coordinate system DC) when device 300 is operating in a second control mode of the awake mode, where detecting such a second motion input command when device 300 is operating in the first control mode may not navigate the GUI in any manner. The operations described may be achieved with a wide variety of graphical elements and visual schemes. Therefore, the embodiments of FIGS. 3A-3D are not intended to be limited to the precise user interface conventions and/or navigations adopted herein. Rather, embodiments may include a wide variety of user interface styles and hierarchies.

An electronic device may be configured to selectively enable a particular control mode and/or to selectively switch between particular control modes in response to detecting any suitable input command, such as an input command able to be made by a user action that is detectable by non-touch input components, such as a blow event detectable by a blow detection assembly. For example, while operating in an awake mode, device 300 may be configured to utilize a blow event detected by blow detection assembly 317 to switch from a first control mode to a second control mode or to otherwise enable a second control mode (e.g., a mode in which the GUI of the awake electronic device may be controlled by user interactions detectable by non-touch input components). As shown by graph 900A of FIG. 9A, an exemplary pressure sensor of an exemplary blow detection assembly of an exemplary electronic device may be operative to detect certain pressure values (Y-axis of the graph) over a duration of time (X-axis of the graph) in which a user may blow air towards the device, while the device is held relatively still, six distinct times. As shown, each blow may sharply increase the detected pressure value by at least 0.06 kiloPascal (kPa) and by as much as 0.15 kPa. As shown by graph 900B of FIG. 9B, an exemplary pressure sensor of an exemplary blow detection assembly of an exemplary electronic device may be operative to detect certain pressure values (Y-axis of the graph) over a duration of time (X-axis of the graph) in which a user may blow air towards the device, while the device is held relatively still, nine distinct times that may include three sets of three blows, in which the blows of a set sequentially increase in strength. As shown, each blow may sharply increase the detected pressure value by at least 0.025 kPa and by as much as 0.10 kPa. As shown by graph 900C of FIG. 9C, an exemplary pressure sensor of an exemplary blow detection assembly of an exemplary electronic device may be operative to detect certain pressure values (Y-axis of the graph) over a duration of time (X-axis of the graph) in which a user may quickly and widely wave an arm that is wearing the device (e.g., left arm LA of FIGS.

8A and 8B) up and down three distinct times. As shown, each waving gesture may sharply increase the detected pressure value by at least 0.06 kPa and by as much as 0.08 kPa. Therefore, it may be possible for a movement of the device quickly through three-dimensional space to generate detectable pressure values that may be similar to those that may be generated due to a blow event. Therefore, in some embodiments, the electronic device may be configured to determine the occurrence of a blow event when the device is determined to be moving less than some threshold amount. For example, a blow event may be determined when a pressure sensor of the device detects a change in pressure of at least 0.03 kPa or any other suitable pressure change threshold amount (e.g., a change between 0.025 kPa and 0.10 kPa) while a motion sensor of the device detects that the device was moving less than a particular movement threshold amount (e.g., an amount above which may trigger or likely contribute to a false blow detection by the pressure sensor (e.g., a movement amount associated with the three distinct peaks of graph 900C)). As just one example, the movement threshold may be an amount of movement that results in a change of pressure detected by the blow detection assembly that is less than another pressure threshold, where the other pressure threshold may be set to any suitable amount of pressure change (e.g., 0.010 kPA or 0.015 kPA or 0.020 kPA) or any suitable amount relative to the first pressure change threshold amount (e.g., the amount to be detected by the pressure sensor to result in a blow event detection).

An electronic device may be configured to enable a second control mode (e.g., a non-touch UI navigation control mode) in response to detecting any suitable type of blow event, including, but not limited to, a single blow operative to increase detected pressure by a threshold amount within a threshold period of time, two or more blows within a particular period of time where each blow increases the detected pressure by a threshold amount, a first blow that increases the detected pressure by a first range (e.g., between 0.03 and 0.06 kPA) and a second blow that increases the detected pressure by a second range (e.g., between 0.06 and 0.09 kPA) where the two blows are within a threshold period of time, and/or the like. Therefore, the electronic device may be configured to utilize the detection of any suitable type of blow or any suitable pattern of blows (e.g., patterns with respect to time and/or pressure change amount and/or the like) for initiating the enablement of a second control mode. Additionally or alternatively, an electronic device may be configured to utilize the detection of any suitable type of blow event to transition back from a second control mode to a first control mode.

Figure 10:
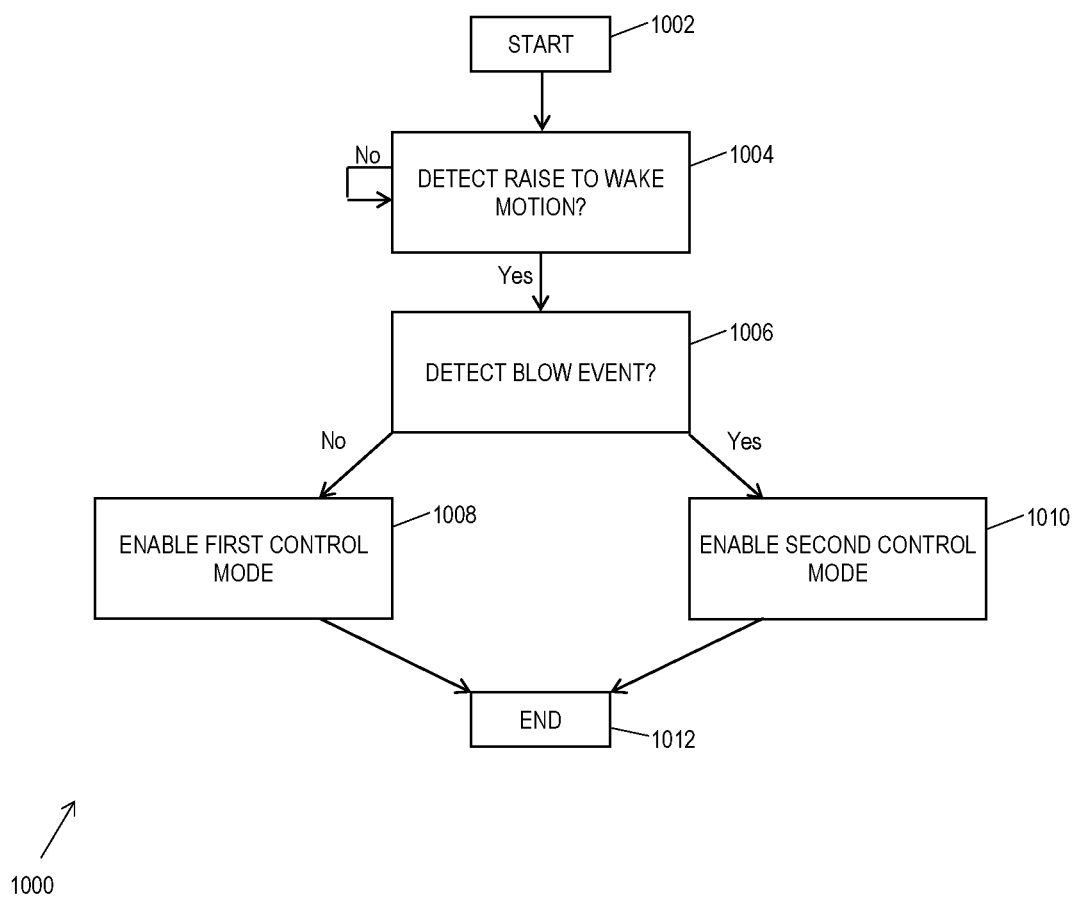
FIGS. 10 and 11 are flowcharts of illustrative processes for using an electronic device having a blow detection assembly.

FIG. 10 is a flowchart of an illustrative process 1000 for using an electronic device with a blow detection assembly. Process 1000 may start at operation 1002 and advance to operation 1004 at which the electronic device may attempt to detect a raise to wake motion (e.g., device 300 may utilize any suitable sensor(s) (e.g., any suitable motion sensor input component(s)) to detect one of any suitable number of possible raise to wake motion events (e.g., the motion of device 300 from the position of FIG. 8A to the position of FIG. 8B) or any other suitable wake event). If such a raise to wake motion event (or any other suitable wake event) is not detected at operation 1004, process 1000 may repeat operation 1004 until such a motion event is detected. If such a raise to wake motion event (or any other suitable wake event) is detected at operation 1004, process 1000 may advance to operation 1006 at which the electronic device may attempt to detect a blow event (e.g., device 300 may utilize any suitable sensor(s) (e.g., any suitable blow detection assembly) to detect one of any suitable number of possible blow events (e.g., detect blow event BE caused by blown air BA of FIG. 8B)). If such a blow event is not detected at operation 1006 (e.g., within a particular amount of time after advancing from operation 1004 (e.g., 3 seconds)), then process 1000 may advance from operation 1006 to operation 1008 at which the electronic device may enable a first control mode (e.g., a mode in which any suitable touch input components may be utilized to control the UI of the electronic device) and then process 1000 may end at operation 1012. However, if such a blow event is detected at operation 1006 (e.g., within a particular amount of time after advancing from operation 1004 (e.g., 3 seconds)), then process 1000 may advance from operation 1006 to operation 1010 at which the electronic device may enable a second control mode (e.g., a mode in which any suitable non-touch input components may be utilized to control the UI of the electronic device, such as motion sensor input component(s) and/or microphone input component(s) and/or blow detection assemblies and/or the like) and then process 1000 may end at operation 1012.

It is understood that the operations shown in process 1000 of FIG. 10 are only illustrative and that existing operations may be modified or omitted, additional operations may be added, and the order of certain operations may be altered.

Figure 11:
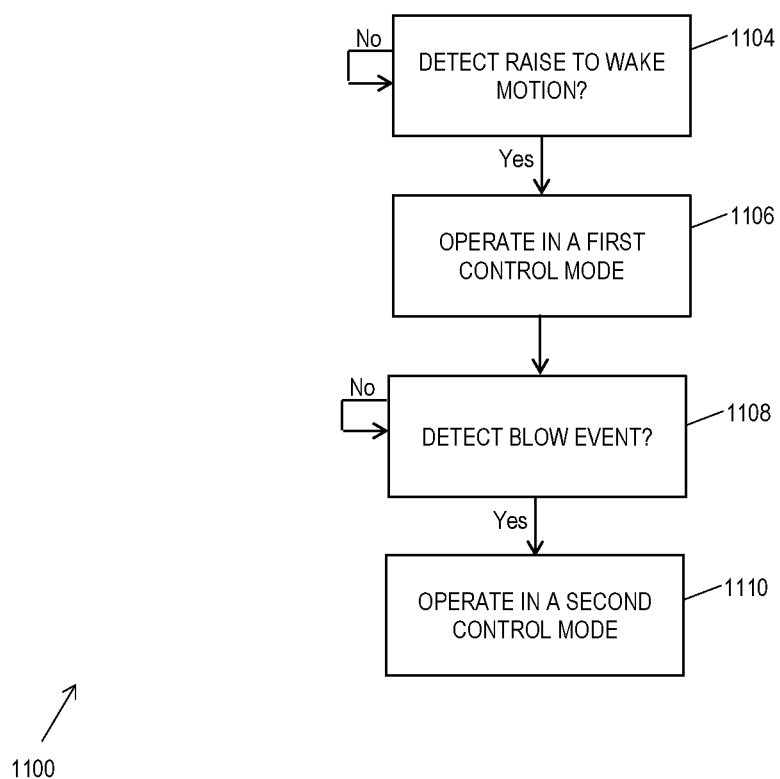

FIG. 11 is a flowchart of another illustrative process 1100 for using an electronic device with a blow detection assembly. Process 1100 may start at operation 1104 at which the electronic device may attempt to detect a raise to wake motion (e.g., device 300 may utilize any suitable sensor(s) (e.g., any suitable motion sensor input component(s)) to detect one of any suitable number of possible raise to wake motion events (e.g., the motion of device 300 from the position of FIG. 8A to the position of FIG. 8B) or any other suitable wake event). If such a raise to wake motion event (or any other suitable wake event) is not detected at operation 1104, process 1100 may repeat operation 1104 until such a motion event is detected. If such a raise to wake motion event (or any other suitable wake event) is detected at operation 1104, process 1100 may advance to operation 1106 at which the electronic device may operate in a first control mode (e.g., a mode in which any suitable touch input components may be utilized to control the UI of the electronic device). Then, while the electronic device is operating in such a first control mode, process 1100 may attempt to detect a blow event at operation 1108 (e.g., device 300 may utilize any suitable sensor(s) (e.g., any suitable blow detection assembly) to detect one of any suitable number of possible blow events (e.g., detect blow event BE caused by blown air BA of FIG. 8B)). If such a blow event is not detected at operation 1108, then process 1100 may repeat operation 1108 until such a blow event is detected. However, if such a blow event is detected at operation 1108, then process 1100 may advance from operation 1108 to operation 1110 at which the electronic device may transition from operating in the first control mode to operating in a second control mode (e.g., a mode in which any suitable non-touch input components may be utilized to control the UI of the electronic device, such as motion sensor input component(s) and/or microphone input component(s) and/or blow detection assemblies and/or the like).

It is understood that the operations shown in process 1100 of FIG. 11 are only illustrative and that existing operations may be modified or omitted, additional operations may be added, and the order of certain operations may be altered.

Therefore, blow detection may be used to trigger a wrist gesture control mode or any different type of control mode of an electronic device such that a user need not physically touch a mechanical button or interface of the device to do so. Therefore, when a user's hands may be preoccupied or when a user may otherwise be unable to provide physical interaction with an input component of the device to provide user input commands (e.g., when the user's hands are wearing gloves, holding items, or when the user is disabled and may not have a hand to provide input commands) or when a user may otherwise be unable to provide any other suitable interaction with an input component of the device to provide user input commands (e.g., provide spoken commands that may be detected by a device microphone (e.g., when the user is in an environment in which the user ought to remain quiet)), the device may be operative to detect one or more blow events in order to enable a control mode that is most effective for such a user (e.g., a second control mode that may enable various gentle or subtle motion gestures (e.g., in any of the six degrees of freedom) of the device to be used as input commands). Triggering such a control mode through detection of a blow event provides an efficient and effective and user friendly experience for a user that may benefit from such a control mode due to a blow event not requiring any direct physical interaction between a user's hand and the device while also not requiring any physical movement of the device by the user. The sequence of a raise to wake motion event detection, a blow event detection, and then use of a motion-based (e.g., wrist gesture) control mode may eliminate the possibilities of false positives for displaying content or otherwise presenting certain device UI. Therefore, the motion-based control mode can be tuned such that very gentle movements of the device may start defining the input commands for controlling the device (e.g., for navigating the device UI).

Certain processes described herein, as well as any other aspects of the disclosure, may each be implemented by software, but may also be implemented in hardware, firmware, or any combination of software, hardware, and firmware. They each may also be embodied as computer-readable code recorded on a computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "up" and "down," "front" and "back," "left" and "right," "upper" and "lower," "top" and "bottom" and "side," "vertical" and "horizontal" and "diagonal," "length" and "width" and "thickness" and "diameter" and "cross-section" and "longitudinal," "X-" and "Y-" and "Z-," "clockwise" and "counterclockwise," and/or the like, may be used herein only for convenience, and that no fixed or absolute directional or orientational limitations are intended by the use of these words. If reoriented, different directional or orientational terms may need to be used in their description, but that will not alter their fundamental nature as within the scope and spirit of the subject matter described herein in any way. Thus, references to the details of the described embodiments are not intended to limit their scope.

What is claimed is:

1. An electronic device comprising:
   a device housing defining an interior space;
   a blow detection assembly positioned at least partially within the interior space; and
   a motion sensor; and
   a controller communicatively coupled to the blow detection assembly and the motion sensor, wherein the controller is operative to:
      use the blow detection assembly to detect a blow when the blow detection assembly detects a change in pressure greater than a first pressure change threshold while the motion sensor detects movement of the electronic device less than a movement threshold, the movement threshold capable of producing a change in pressure sufficient to cause a false blow event; and
      in response to detection of the blow event, automatically initiate a new control mode of the electronic device.

2. The electronic device of claim 1, wherein when the electronic device is operating in the control mode, the controller is operative to navigate a user interface of the electronic device using motion sensor data from the motion sensor.

3. The electronic device of claim 1, wherein the first pressure change threshold is at least 0.03 kPA.

4. The electronic device of claim 1, wherein the movement threshold is an amount of movement that results in a change of pressure detected by the blow detection assembly that is less than a second pressure change threshold.

5. The electronic device of claim 4, wherein the second pressure change threshold is no greater than the first pressure change threshold.

6. The electronic device of claim 4, wherein:
   the first pressure change threshold is at least 0.03 kPA; and
   the second pressure change threshold is no greater than 0.02 kPA.

7. The electronic device of claim 1, wherein the controller is operative to detect the blow event in response to the electronic device transitioning from a lower power mode to a higher power mode.

8. The electronic device of claim 1, wherein the blow event comprises a pattern of two or more distinct currents of air blown on the device housing.

9. An electronic device comprising:
- a device housing defining an interior space;
- an array of pressure sensors positioned at least partially within the interior space;
- a motion sensor; and
- a controller communicatively coupled to the array of pressure sensors and the motion sensor, wherein the controller is operative to combine sensor signals from the array of pressure sensors and detect a blow event on the device housing when the combined sensor signals detect a change in pressure greater than a first pressure change threshold while the motion sensor detects movement of the electronic device less than a movement threshold, the movement threshold capable of producing a change in pressure sufficient to cause a false blow event.

10. The electronic device of claim 9, wherein:
- in response to the detection of the blow event, the controller is further operative to automatically initiate a control mode of the controller; and
- when operating in the control mode, the controller is further operative to navigate a user interface of the electronic device using motion sensor data from the motion sensor.

11. A method for operating an electronic device comprising a housing, a blow detection assembly positioned at least partially within the housing, a motion sensor, and a processor, the method comprising:
- detecting a first blow event on the housing with the blow detection assembly by detecting a change in pressure greater than a first pressure change threshold while detecting a first movement of the electronic device less than a movement threshold, the movement threshold capable of producing a change in pressure sufficient to cause a false blow event; and
- automatically triggering a first control mode of the processor based on the detecting.

12. The method of claim 11, further comprising:
- detecting a second blow event during a second control mode of the processor; and
- detecting and utilizing a second movement of the electronic device to control a user interface of the electronic device during the second control mode.

13. The method of claim 11, further comprising detecting a wake event, wherein:
- detecting the first blow event occurs within a threshold duration of time after detecting the wake event; and
- automatically triggering the first control mode of the processor based on detecting the first blow event within the threshold duration of time after the detecting the wake event.

* * * * *

UNITED STATES PATENT AND TRADEMARK OFFICE
CERTIFICATE OF CORRECTION

PATENT NO. : 11,099,635 B2  
APPLICATION NO. : 16/834783  
DATED : August 24, 2021  
INVENTOR(S) : Jiang Wang Page 1 of 1

It is certified that error appears in the above-identified patent and that said Letters Patent is hereby corrected as shown below:

In the Claims

In Column 20, Line 29, in Claim 1, after "space;" delete "and".

In Column 20, Line 34, in Claim 1, after "blow" insert --event--.

In Column 20, Line 43, in Claim 1, after "initiate a" delete "new".

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*